March 28, 1967    A. A. LACHANCE ETAL    3,311,197
AUTOMATICALLY ACTUATED SHOPPING CART
Filed March 14, 1966
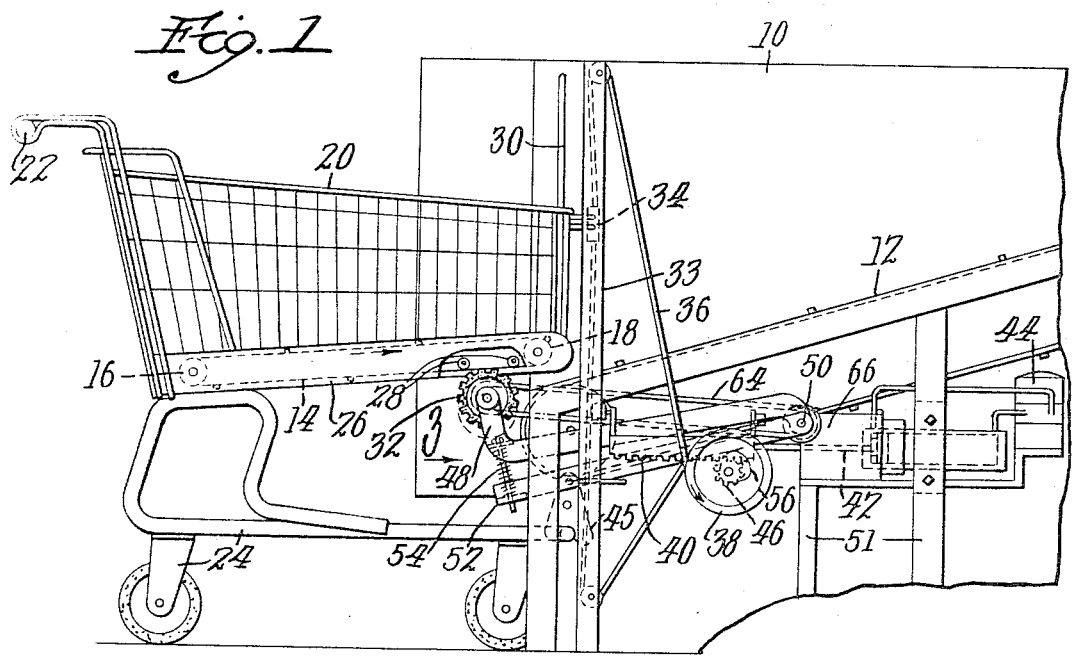
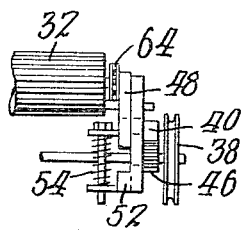
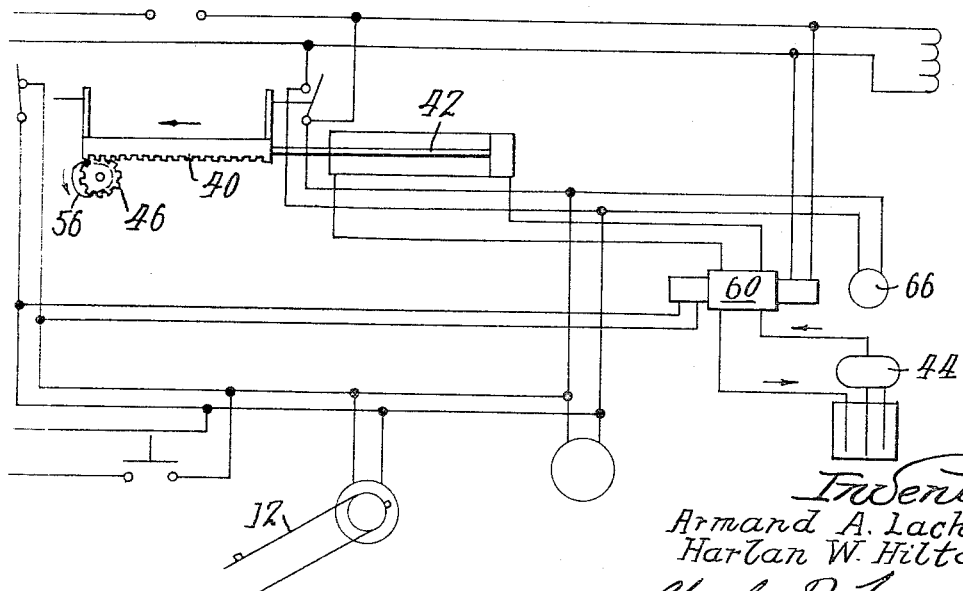
Inventors
Armand A. Lachance
Harlan W. Hilton
By Charles R. Fay,
Attorney United States Patent Office 3,311,197
Patented Mar. 28, 1967

3,311,197
AUTOMATICALLY ACTUATED
SHOPPING CART
Armand A. Lachance, % American Metal Products Co., Southbridge St., Auburn, Mass., and Harlan W. Hilton, Dudley, Mass.; said Hilton assignor to said Lachance
Filed Mar. 14, 1966, Ser. No. 534,166
6 Claims. (Cl. 186—1)

This invention relates to an automatically actuated shopping cart of the type having a conveyor or the like in the bottom of the basket of the cart together with power operated means at the checkout station for actuating the same, and also to open the front gate of the cart, so that the contents of the shopping cart may be automatically discharged onto the checkout counter.

Other objects of the invention include the provision of power operated means which is actuated completely under control of the checkout operator or cashier, and which requires no effort on the part of the shopper. There is a power operated roll which is movable by power vertically from an inoperative to an operative position relative to the conveyor in the bottom of the basket of the shopping cart when the shopping cart has been properly positioned with respect to the checkout counter, whereby it is snugly and tightly in contact with the conveyor in the basket so as to operate the same positively, with no attention whatsoever on the part of the shopper.

This invention provides for a very easily positionable cart which requires no lifting or exertion on the part of the shopper except to position the same correctly at the checkout counter, whereupon the cashier or other store operator merely presses a switch to energize and to cause the power operated roll to rise into operative relationship with respect to the belt type conveyor in the bottom of the cart.

Reference is to be had to copending application Ser. No. 478,860, filed Aug. 11, 1965.

Other objects and advantages of the invention will appear hereinafter.

Reference is to be had to the accompanying drawings in which:

FIG. 1 is a view in side elevation illustrating the invention;

FIG. 2 is a diagrammatic representation of the power operated means therefor, and FIG. 3 is a view in side elevation of a part of the device looking in the direction of arrow 3 in FIG. 1.

In carrying out the present invention, the reference numeral 10 indicates a checkout counter which may be of any desired structure, shape, etc. The cashier or checkout operator stands at the station usually behind the counter. The checkout counter is provided with a power operated conveyor 12 which in this case is utilized at the will of the operator to move the merchandise to an elevated position where it can be checked out. Other forms of such power operated conveyors can be used.

A generally conventional nesting shopping cart having a tapering basket with the usual rear swinging gate is provided. However, the basket of this shopping cart is provided with a belt or other conveyor forming the bottom of the basket and being indicated at 14. This conveyor is trained over rolls 16 and 18 near the rear and forward portions of the basket respectively and since there is no mechanism projecting laterally beyond the basket, the cart is a nesting cart having a tapering basket construction 20, etc. as is conventional except for the conveyor. This cart also has a pusher handle 22, a wheel frame 24, etc.

At the side edges of the conveyor 14, there may be provided a pair of side plates 26, 26, the rollers 16 and 18 being conveniently journaled in these side plates, which do not extend beyond the confines of the basket 20. Also journaled on the side plates 26, 26 are a pair of relatively small rollers 28. These rollers are spaced apart a certain predetermined distance and they bear on the lower run of the conveyor 14 holding the same in position against the thrust of the actuating power driven roll as will be described hereinafter. Both conveyors 12 and 14 may be provided with various kinds of cleats, etc. in order to insure that the various goods purchased may be expelled from the basket and raised or progressed forwardly on conveyor 12.

The forward wall of the basket 20 is provided with a guillotine type of front gate which is indicated at 30. This front gate rises in order to clear the front wall of the basket so that the groceries or other merchandise can be expelled by conveyor 14 and means is provided for so raising this gate prior to any actuation of conveyor 14 by the power driven roll which is indicated at 32.

The means for raising the gate is disclosed in the copending patent application above referred to but in brief comprises a vertical support 33 which is in fixed relation with respect to the counter 10. In this support there is guided a lifter member generally indicated at 34 which has a pair of fingers as shown in FIG. 1. When the cart has been properly positioned, these fingers engage a projection at the bottom of gate 30 and lift the same when the element 34 is raised as for instance by a cable 36. Cable 36 is actuated by a pulley 38 in turn actuated by a rack 40 which moves horizontally from the position shown in FIG. 2 to the position shown in FIG. 1 under the influence of a ram, piston or the like 42.

This ram or piston is actuated by a pump 44 under control of the operator or cashier and may be provided with the usual limit safety switches in order to prevent overrunning, etc. As the rack 40 moves forwardly, it turns a spur gear 46 on the shaft for pulley 38 in the direction of the arrow in FIG. 2, thus turning pulley 38 in the direction to raise gate 30.

The power driven roll 32 is preferably of a relatively soft corrugated nature so as to provide adequate friction against the lower run of conveyor 14 and it impinges upon the bottom side of the lower run of the conveyor between the two small rollers 28, 28. Thus the conveyor is firmly held in position and the power driven roller 32 engages the same forcibly so as to drive the belt in the direction to expel the merchandise from the basket.

The power driven roller 32 is mounted on the up-turned end of a lever indicated at 48. Lever 48 is pivoted at 50 on framework or the like 51 which is generally concealed from view under the conveyor 12.

A second lever 52 is provided beneath lever 48, and lever 52 may also be pivoted at 50. There is a spring 54 between the levers and bearing on both, so that the levers 52 and 48 are movable together and are normally spaced by the spring. The spring is provided with a pin which can be fixed for instance to lever 48 and passes movably through an aperture in the lever 52. When lever 52 is raised it also raises lever 48, and power driven roll 32, but the spring and pin construction provides a lost-motion effect so as to provide a yielding pressure of the power driven roll 32 against the lower run of conveyor 14.

A cam indicated at 56 is fixed to and rotated by spur gear 46 and it bears on the lower edge of the lever 52 so that as cam 56 moves in a counterclockwise direction from an inoperative position to an operative position as shown in FIG. 1, it raises lever 52, spring 54, lever 48 and places power driven roller 32 in desired contact with respect to the lower run of conveyor 14.

However it is important to note that there is a relatively long dwell with respect to cam 56. At the rest point when the power driven roll is in a down inoperative position, the cam is as shown in FIG. 2, the ram 42 and rack 40 are backed to the right, and the gate lifter element 34 is down.

When the cart is brought into the correct position and latched by latch 45, the operator merely pushes the switch which initiates the operation of the ram. This latch is disclosed and described in our aforesaid patent application, but essentially this latch automatically operates to push the cart slightly to the rear by means under control of the operator, to separate the cart from its discharging position which is shown in FIG. 1 herein. The fingers of the gate lifter 34 engage the gate and raise it, but the cam 56 does not raise to engage lever 52 until the gate is in its open condition.

It will of course be seen that it is important not to have any possibility of power operation of belt 14 until the gate is fully opened or otherwise the merchandise in the basket will impinge upon the gate and not be fed forwardly out of the basket onto conveyor 12. The reference numeral 60 represents a valve which can be used to direct the fluid from the pump 44 to move the piston 42 in either direction as called upon and the piston and rack are held in their leftwardmost position as long as desired. In order to return the parts to their original position, a switch at 62 is manipulated to return the valve to its opposite position, thus bringing the gate down and lowering the levers 48 and 52 and also providing for other operations which are explained in the above identified application.

The main advantage of the present construction resides in the fact that when the shopper pushes the cart to the required position relative to the counter, the power driven roll is in a downward position and it does not engage the cart, so that there is no need for exertion on the part of the shopper as is the case if he must push the cart with the lower run of conveyor 14 in engagement with the power driven roll. On the other hand the roll is down and in out-of-the-way position as shown in dotted lines in FIG. 1 but it needs only a small upward or vertical motion in order to engage the conveyor 14 in order to operate it, and this is provided by power by the attendant.

The power driven roller 32 can be operated by a belt, sprocket or the like 64 which in turn can be driven on a fixed shaft by a motor indicated at 66.

Having thus described our invention and the advantages thereof, we do not wish to be limited to the details herein disclosed, otherwise than as set forth in the claims, but what we claim is:

1. The combination of an automatically discharging shopping cart and a checkout counter, wherein the cart includes a basket having a front gate and a conveyor bottom, a power operated device adapted to drive said conveyor when the conveyor is in proper position relative to the checkout counter, a support for said power operated device movable to position the power operated device in operative and inoperative positions selectively, and a cam under control of the operator to move said power operated device between operative and inoperative positions.

2. The combination of claim 1 wherein said power operated means comprises a power driven roll and the support is mounted for motion generally upwardly to operative condition.

3. The combination of claim 1 wherein said power operated means comprises a power driven roll and the support comprises a lever which is pivotally mounted to bring the roll into engagement with said conveyor or selectively to move it away from said conveyor under influence of the cam.

4. The combination of claim 1 wherein said gate is openable, and including a fluid operated cylinder, a piston and a piston rod therefor, means connecting the piston rod to said cam to operate it, and means actuated by said piston rod for moving the front gate of the basket to open position.

5. The combination of claim 1 including means to move said gate to open position, said gate moving means being actuated by the means which actuates the cam.

6. The combination of claim 1 including means to move said gate to open position, said gate moving means being actuated by the means which actuates the cam to move the power operated device between operative and inoperative positions, and includes a rotary member, means on the latter connected to the gate moving means to move the same, said cam being actuated in timed sequence to follow the action of the gate moving means, so that the gate is fully opened prior to actuation of the conveyor in the basket.

References Cited by the Examiner
UNITED STATES PATENTS 2,569,711 10/1951 Foster _____ 186—1.1
3,036,722 5/1962 Sharaway.

EVON C. BLUNK, *Primary Examiner.*

H. C. HORNSBY, *Assistant Examiner.*